(12) United States Patent
Lourenco et al.

(10) Patent No.: US 8,196,817 B2
(45) Date of Patent: Jun. 12, 2012

(54) SYSTEMS AND METHODS FOR FACILITATING PAYMENT TRANSACTIONS USING A FINANCIAL TRANSACTION CARD

(75) Inventors: Fernando Augusto Marques Lourenco, Kessel-Lo (BE); Jeremy King, Cheshire (GB)

(73) Assignee: MasterCard International Incorporated, Purchase, NY (US)

( * ) Notice: Subject to any disclaimer, the term of this patent is extended or adjusted under 35 U.S.C. 154(b) by 0 days.

(21) Appl. No.: 12/267,249

(22) Filed: Nov. 7, 2008

(65) Prior Publication Data
US 2010/0116879 A1     May 13, 2010

(51) Int. Cl.
*G06K 5/00* (2006.01)
*G06K 19/00* (2006.01)
*G06Q 40/00* (2012.01)
*B42D 11/00* (2006.01)
*B42D 15/00* (2006.01)

(52) U.S. Cl. .......... 235/380; 235/382; 235/487; 705/35; 705/37; 705/38; 283/61; 283/62; 283/57; 283/72

(58) Field of Classification Search ................ 235/380, 235/382, 487; 705/35, 37–38; 283/61–62, 283/72, 57
See application file for complete search history.

(56) References Cited

U.S. PATENT DOCUMENTS

| | | | |
|---|---|---|---|
| 4,897,533 A | 1/1990 | Lyszczarz | |
| 4,978,146 A | 12/1990 | Warther et al. | |
| 5,495,981 A | 3/1996 | Warther | |
| 5,641,183 A * | 6/1997 | Diamond | 283/58 |
| 5,769,457 A | 6/1998 | Warther | |
| 5,863,076 A | 1/1999 | Warther | |
| 6,030,701 A | 2/2000 | Johnson et al. | |
| 6,039,356 A | 3/2000 | Warther et al. | |
| 6,305,716 B1 | 10/2001 | Warther et al. | |
| 6,644,551 B2 | 11/2003 | Clayman et al. | |
| 6,769,718 B1 | 8/2004 | Warther et al. | |
| 6,893,699 B2 | 5/2005 | Ito et al. | |
| 2005/0080730 A1* | 4/2005 | Sorrentino | 705/39 |
| 2006/0131389 A1* | 6/2006 | Kwon | 235/380 |
| 2008/0136162 A1* | 6/2008 | Haas et al. | 283/95 |

* cited by examiner

*Primary Examiner* — Michael G Lee
*Assistant Examiner* — Laura Gudorf
(74) *Attorney, Agent, or Firm* — Armstrong Teasdale LLP

(57) ABSTRACT

A financial transaction card associated with an account of a cardholder is provided. The financial transaction card includes a front side, a back side, a signature block, and a validation code. The signature block includes a substrate having a bottom face and a top face wherein the bottom face is coupled to at least one of the sides of the card. The top face is substantially planar and includes a first data field and a second data field. The first data field and the second data field are non-overlapping. The validation code is associated with the account and is displayed within the second data field.

18 Claims, 5 Drawing Sheets

SYSTEMS AND METHODS FOR FACILITATING PAYMENT TRANSACTIONS USING A FINANCIAL TRANSACTION CARD

BACKGROUND OF THE INVENTION

This invention relates generally to systems and methods for facilitating payment transactions using a payment card, and more particularly to a financial transaction card having a signature block that includes a visually distinct data field configured to display and facilitate a useful life of a card validation code, and method of using the same.

Financial transaction cards have made great gains in the United States and elsewhere as a means to attract financial accounts to financial institutions and, in the case of credit cards, as a medium to create small loans and generate interest income for financial institutions. Nonetheless, the financial transaction card industry is subject to certain well-known problems.

Taking the credit card industry, for example, it is well-known that at least some persons will engage in illegal or potentially illegal activities. Specifically, one person may steal a credit card from another person and attempt to use the credit card to purchase products, pay for services, or attempt to utilize the card to obtain cash. Another illegal activity involving credit cards includes a person attempting to steal credit card information by "skimming" sensitive financial data (i.e., stored within the magnetic strip, etc.) from a genuine card, and then applying the stolen data to a cloned card. The attacker then uses the cloned card with the genuine card data to conduct fraudulent transactions without the knowledge of the cardholder.

Such problems are not limited to credit cards. Other examples include debit cards, gift cards, stored value cards, and check cards. Of course, in certain transactions, for example, on-line and telephonic transactions, physical possession of the financial transaction card for presentment to the merchant is not needed. Rather, only the numbers (e.g., account numbers and/or expiration date) associated with the financial transaction card are needed to complete a transaction. The fact that a physical financial transaction card does not have to be presented to a merchant for certain transactions only amplifies the problems mentioned herein.

The other parties involved in facilitating such transactions, namely the acquirer bank, the issuer bank, and the financial transaction card network, which is sometimes referred as an interchange, generally do not require the legal cardholder to pay for such fraudulent transactions. Such a requirement will likely result in the loss of goodwill and perhaps the loss of the legal cardholder as a customer. However, the fraudulent transactions are a loss to one or more of these entities. As a result, companies have tried to find an effective way to ensure the security of transactions, especially those in which the card is not present, and to decrease the risk of theft or misuse of financial information.

At least one known security feature used with such transaction cards incorporates the use of a card validation code on the signature block of the financial transaction card (see FIG. 4). As shown in FIG. 4, the signature block is located on the back side of the financial transaction card. The signature block contains preprinted indicia, such as lines and/or the network or interchange provider name and/or logo. In the example embodiment, angled lines are shown extending between the side edges of the top face of the signature block. This preprinted indicia acts as a security feature (i.e., tamper evidence properties) by showing evidence of the removal of the cardholder's signature from the signature block. Printed on the signature block is also a set of alphanumeric characters, representing a portion of the cardholder's account number. In alternative embodiments, a full account number may be printed on the signature block. Also located in the signature block shown in FIG. 4, directly contiguous to the partial account number, is a three digit security code, also known as the card validation code ("CVC"). The card validation code may also be referred to as a card security code or card verification value, and is sometimes referred to as CVC2 or CVV2. The CVC can be an alphanumeric code constructed by a cryptographic process based on card data, such as the card number, the expiration date, etc., and is unique to the card. Merchants and others who accept credit cards, debit cards, and the like for payment use the CVC and other methods to prevent use of such cards by those who are not authorized to do so. Supplying this code in a transaction not carried out in person is intended to verify that the customer has the legitimate card in his or her possession. Unfortunately, the proximate location of the CVC with respect to the partial account number on the signature block has created problems in its utility. For example, cardholders have difficulty distinguishing the partial account number from the CVC due to the close proximity of the two sets of numbers in the signature block. The appearance suggests one cohesive set of numbers instead of two distinct sets. As a result, transactions are lost because of the misidentification of the CVC.

To overcome the flaws of the previous embodiment shown in FIG. 4, another card design was created in which the CVC is distinctly separate from the partial account number (see FIG. 5). In this known embodiment shown in FIG. 5, the CVC is printed on a designated area outside of the signature block. The partial account number remains printed on the signature block and the CVC is printed off the signature panel in a white space on the card body (i.e., on the plastic itself). This design enables cardholders to more easily identify the CVC as separate from the partial account number. However, in this other embodiment, the white space containing the CVC and the signature block are at different heights relative to the back side of the card, with the signature block being at a greater relative height. As a result, during the indent printing process, wherein the partial account number is printed on the signature block and the CVC is printed on the white space of the card face, the printing head is closer to the signature block than to the white area on the card body. This difference in distance between the surfaces and the printing head, and the difference in the types of surfaces being printed on often results in different depths of indentation and different print qualities. For example, the CVC located on the white area of the card body may receive less indentation and less ink from the printing head because of the increased distance between the white area surface of the card and the printing head, and because of the type of material being printed on. With less ink being applied to display the CVC, the security code is susceptible to being more easily removed from the face of the financial transaction card, either intentionally or through normal wear and tear on the card, which could result in potentially preventing a cardholder from conducting a card-not-present transaction and a lower quality of indentation hampering a merchant's ability to validate the card.

Accordingly, a financial transaction card having a signature block that includes a validation code that is easily distinguishable by a user and resists removal is needed. A financial transaction card having a validation code with an increased useful life (i.e., a validation code that resists removal from wear) is needed.

BRIEF DESCRIPTION OF THE INVENTION

In one aspect, a financial transaction card associated with an account of a cardholder is provided. The financial transaction card includes a front side, a back side, a signature block, and a validation code. The signature block includes a substrate having a bottom face and a top face wherein the bottom face is coupled to at least one of the sides of the card. The top face is substantially planar and includes a first data field and a second data field. The first data field and the second data field are non-overlapping. The validation code is associated with the account and is displayed within the second data field.

In another aspect, a method for facilitating use of a financial transaction card associated with an account of a cardholder is provided. The method includes issuing the financial transaction card to the cardholder. The financial transaction card includes a signature block and a validation code associated with the account. The signature block having a bottom face and a top face wherein the bottom face is coupled to a side of the card, and the top face being substantially planar and including a first data field and a second data field. The first data field and the second data field being non-overlapping. The validation code is displayed within the second data field. The method further includes storing cardholder information within a database including a name of the cardholder, an account number associated with the cardholder, and the validation code displayed within the second data field, prompting the cardholder to provide the account number and the validation code displayed within the second data field in order to engage in a financial transaction, comparing the provided account number and validation code with the cardholder information stored within the database, and authenticating the card for the financial transaction.

DETAILED DESCRIPTION OF THE INVENTION

Figure 1:
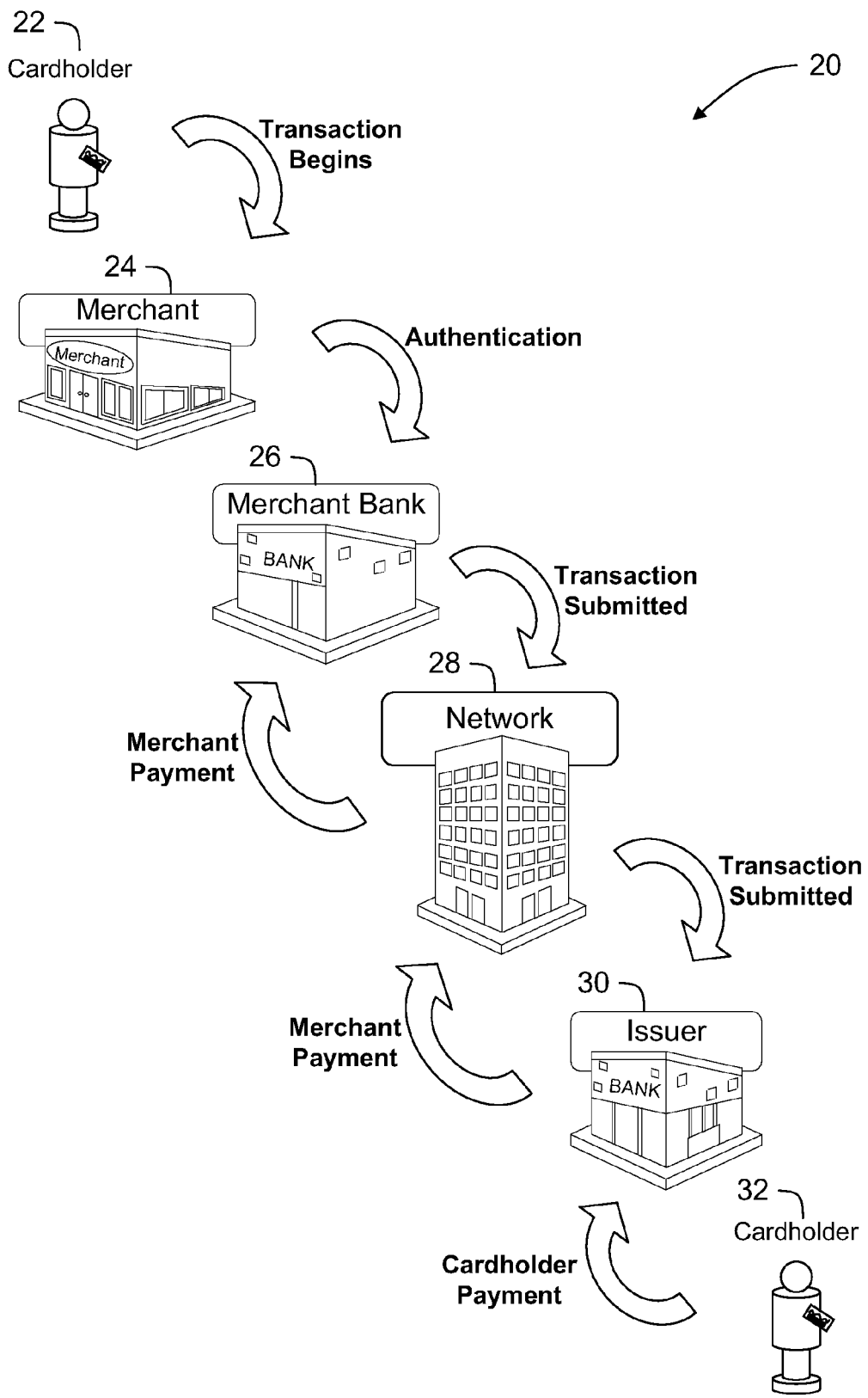
FIG. 1 is a flowchart illustrating a typical financial transaction using a financial transaction card payment system.

Described in detail herein are exemplary embodiments of systems and methods for facilitating payment transactions using a payment card. Specifically, a financial transaction card is described herein that includes a signature block having a visually distinct data field configured to display a card validation code. By displaying the card validation code in a visually distinct data field, the payment card increases the likelihood that the cardholder will provide the proper validation code when required to do so in making certain purchases or other financial transactions. Accordingly, the embodiments of the payment card described herein facilitate completing financial transactions and further establish the authenticity of the card. In addition, the data field used for displaying the card validation code also is configured to increase the life of the card validation code by providing a printing area that is positioned on substantially the same plane as account numbers also sometimes displayed within the signature block. Accordingly, by providing a transaction card that includes a data field that increases the life of the card validation code (i.e., improved resistance to removal of the printed characters) in turn results in a transaction card that also has an increased useful life and continued card authentication effectiveness.

The exemplary embodiments of the systems and methods described herein also help to ensure that the sales and other activities associated with a particular financial transaction card are being initiated by the proper user, especially for those transactions that are not made in person as the code printed onto the signature block is not easy to steal by skimming as may be the case with other sensitive data stored in the magnetic strip. Such systems and methods would provide at least some confidence that the legal holder of the financial transaction card is the person attempting the transaction. As will be further explained herein, with so many financial transaction card purchases being conducted, for example, over the Internet, telephone, and via other not-in-person methods, it has become increasingly difficult to ensure that the proper cardholder is conducting the transaction, or even in possession of the physical embodiment of the financial transaction card. Once it is determined that a person attempting a transaction does not appear to be in physical possession of the financial transaction card using the systems and methods described herein, the entity operating the financial transaction card network or interchange (e.g., MasterCard® ) or the transaction authorizer (an issuer or its agent) would then work to prevent the transaction from occurring. (MasterCard® is a registered trademark of MasterCard International® Incorporated located in Purchase, N.Y.).

The systems and methods facilitate, for example, electronic submission of information printed on the physical embodiment of the financial transaction card using a client system, automated extraction of information associated with the physical embodiment of the financial transaction card, and web-based reporting for internal and external system users. A technical effect of the systems and methods described herein include at least one of (a) providing a financial transaction card with a card validation code thereon as described below, (b) storing the validation code that is associated with the physical embodiment of the financial transaction card within the financial transaction card network or interchange, and (c) utilizing the validation code as a portion of a process to authenticate the card and/or cardholder, specifically for transactions not made in person by requiring the purchaser to enter the validation code that is printed on the physical embodiment of the financial transaction card.

In one embodiment, a physical embodiment of the financial transaction card is provided having a validation code printed thereon. The card is provided to a cardholder or an account holder. Transactions are sometimes performed using a client user interface and/or a web interface for user input. In an exemplary embodiment, the system is web enabled and is accessible via the Internet. In a further exemplary embodiment, the system is being run in a Windows® environment (Windows® is a registered trademark of Microsoft® Corporation, Redmond, Wash.). The methods are flexible and capable of being run in various different environments without compromising any major functionality.

The systems and methods are not limited to the specific embodiments described herein. In addition, components of each system and each method can be practiced independent and separate from other components and methods described herein. Each component and method also can be used in combination with other assembly packages and processes.

The present invention is related to a financial transaction card payment system, such as a credit card payment system using the MasterCard® interchange. The MasterCard® interchange is a proprietary communications standard promulgated by MasterCard International® Incorporated for the exchange of financial transaction data between financial institutions that are members of MasterCard International® Incorporated. In a typical financial payment system, a financial institution called the "issuer" issues a financial transaction card, such as a credit card, to a consumer, who uses the financial transaction card to tender payment for a purchase from a merchant. The issuer or its agent may authorize a financial transaction (for example, a purchase) by using a series of validation processes that may include card and cardholder validation or authentication. To accept payment with the financial transaction card, the merchant must normally establish an account with a financial institution that is part of the financial payment system. This financial institution is usually called the "merchant bank," the "acquiring bank," or the "acquirer bank." The request may be performed over the telephone or the Internet, but is usually performed through the use of a point-of-sale terminal, which reads the consumer's account information from a magnetic strip on the financial transaction card and communicates electronically with transaction processing computers of the merchant bank. Alternatively, a merchant bank may authorize a third party to perform transaction processing on its behalf. In this case, the point-of-sale terminal will be configured to communicate with the third party. Such a third party is usually called a "merchant processor" or an "acquiring processor." In the embodiment performed over the telephone or Internet, which is sometimes referred to involving virtual merchants, ecommerce or card-not-present transactions, card data is inputted by the consumer into a computer or telephone and then communicated to the merchant bank for further processing.

FIG. 1 is a flowchart 20 illustrating a typical financial transaction using a financial transaction card payment system. When a cardholder 22 tenders payment for a purchase with a financial transaction card, a merchant 24 requests authorization from a merchant bank 26 for the amount of the purchase. Using a network 28, computers of merchant bank 26 communicate with computers of issuer 30 to determine whether the cardholder's account is in good standing and whether the purchase is covered by the cardholder's available credit line. Based on these determinations, the request for authorization will be declined or accepted. If the request is accepted, an authorization code is issued to the merchant. When a request for authorization is accepted, the available credit line of cardholder's account 32 is decreased. After a transaction is captured, the transaction is settled between merchant 24, merchant bank 26, and issuer 30. Settlement refers to the transfer of financial data or funds between merchant 24, merchant bank 26, and issuer 30 related to the transaction. Usually, transactions are captured and accumulated into a "batch," which are settled as a group.

Normally, a charge is not posted immediately to a cardholder's account because bankcard associations, such as MasterCard International® Incorporated, have promulgated rules that do not allow a merchant to charge, or "capture," a transaction until goods are shipped or services are delivered. When a merchant ships or delivers the goods or services, the merchant captures the transaction by, for example, appropriate data entry procedures on the point-of-sale terminal. If a cardholder cancels a transaction before it is captured, a "void" is generated. If a cardholder returns goods after the transaction has been captured, a "credit" is generated.

Financial transaction cards or payment cards can refer to credit cards, debit cards, and various types of prepaid cards. These cards can all be used as a method of payment for performing a transaction. As described herein, the term "financial transaction card" or "payment card" includes cards such as credit cards, debit cards, and prepaid cards, but also includes any other devices that may hold payment account information, such as mobile phones, personal digital assistants (PDAs), and key fobs. While generally described as related to a purchasing transaction, it should be understood that the descriptions are applicable to bill payment, reward redemption, and checking of statements.

Figure 2:
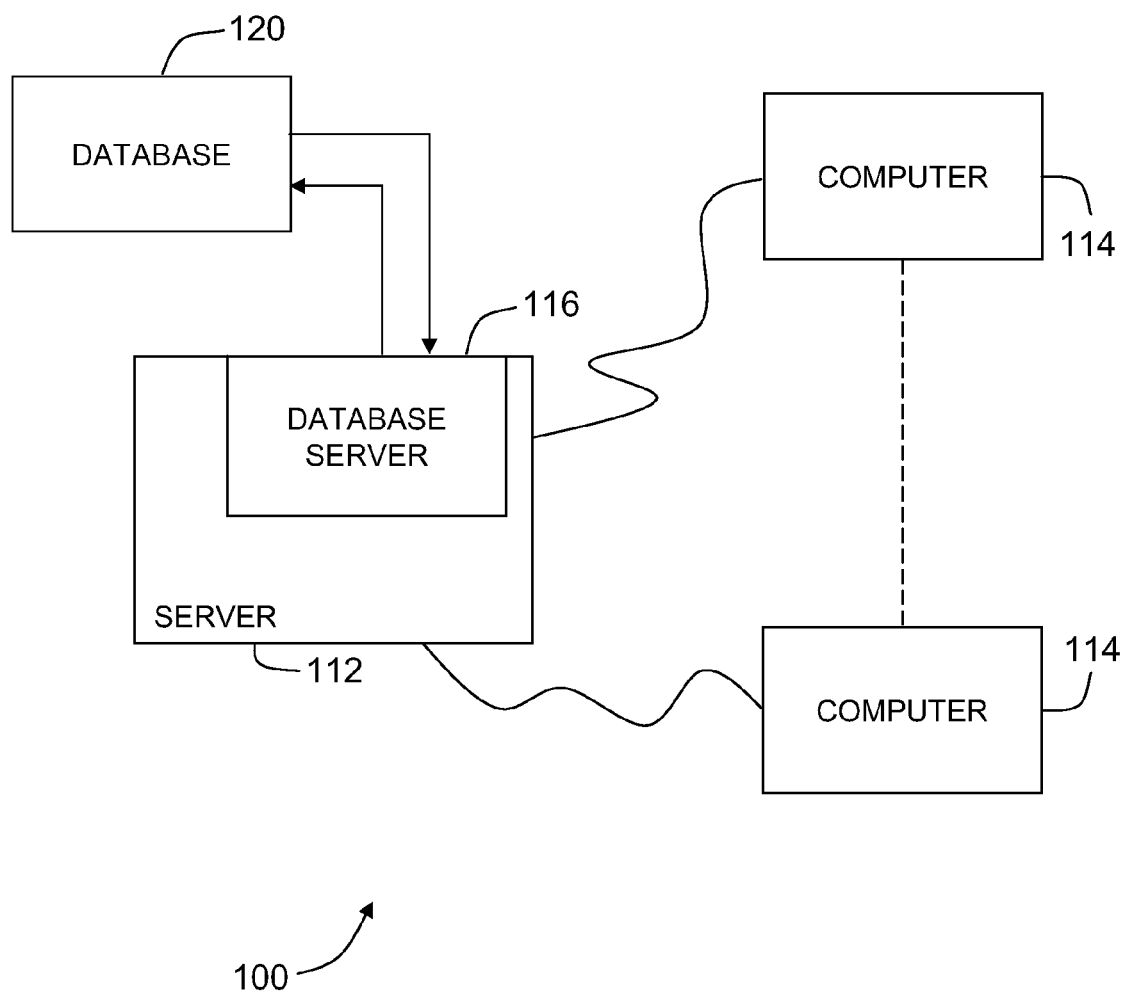
FIG. 2 is a simplified block diagram of an exemplary embodiment of a server architecture of a system in accordance with one embodiment of the present invention.

FIG. 2 is a simplified block diagram of an exemplary system 100 in accordance with one embodiment of the present invention. In one embodiment, system 100 is the financial transaction card payment system shown in FIG. 1, which can be utilized for ensuring a person or entity attempting to utilize a financial transaction card is in possession of the physical embodiment of the financial transaction card. More specifically, in the example embodiment, system 100 includes a server system 112, and a plurality of client sub-systems, also referred to as client systems 114, connected to server system 112. In one embodiment, client systems 114 are computers including a web browser, such that server system 112 is accessible to client systems 114 using the Internet. Client systems 114 are interconnected to the Internet through many interfaces including a network, such as a local area network (LAN) or a wide area network (WAN), dial-in-connections, cable modems and special high-speed ISDN lines. Client systems 114 could be any device capable of interconnecting to the Internet including a web-based phone, personal digital assistant (PDA), or other web-based connectable equipment. A database server 116 is connected to a database 120 containing information on a variety of matters, as described below in greater detail. In one embodiment, centralized database 120 is stored on server system 112 and can be accessed by potential users at one of client systems 114 by logging onto server system 112 through one of client systems 114. In an alternative embodiment, database 120 is stored remotely from server system 112 and may be non-centralized.

As discussed below, validation codes that are associated with physical embodiments of individual financial transaction cards are stored within database 120, along with a name of the cardholder and other cardholder related information including a transaction history of the cardholder with the card. Server system 112 is configured to receive transaction information including a validation code from a transaction card involved in a financial transaction, and compare the received validation code to a corresponding validation code stored within database 120 in order to determine whether to authorize the transaction.

Figure 3:
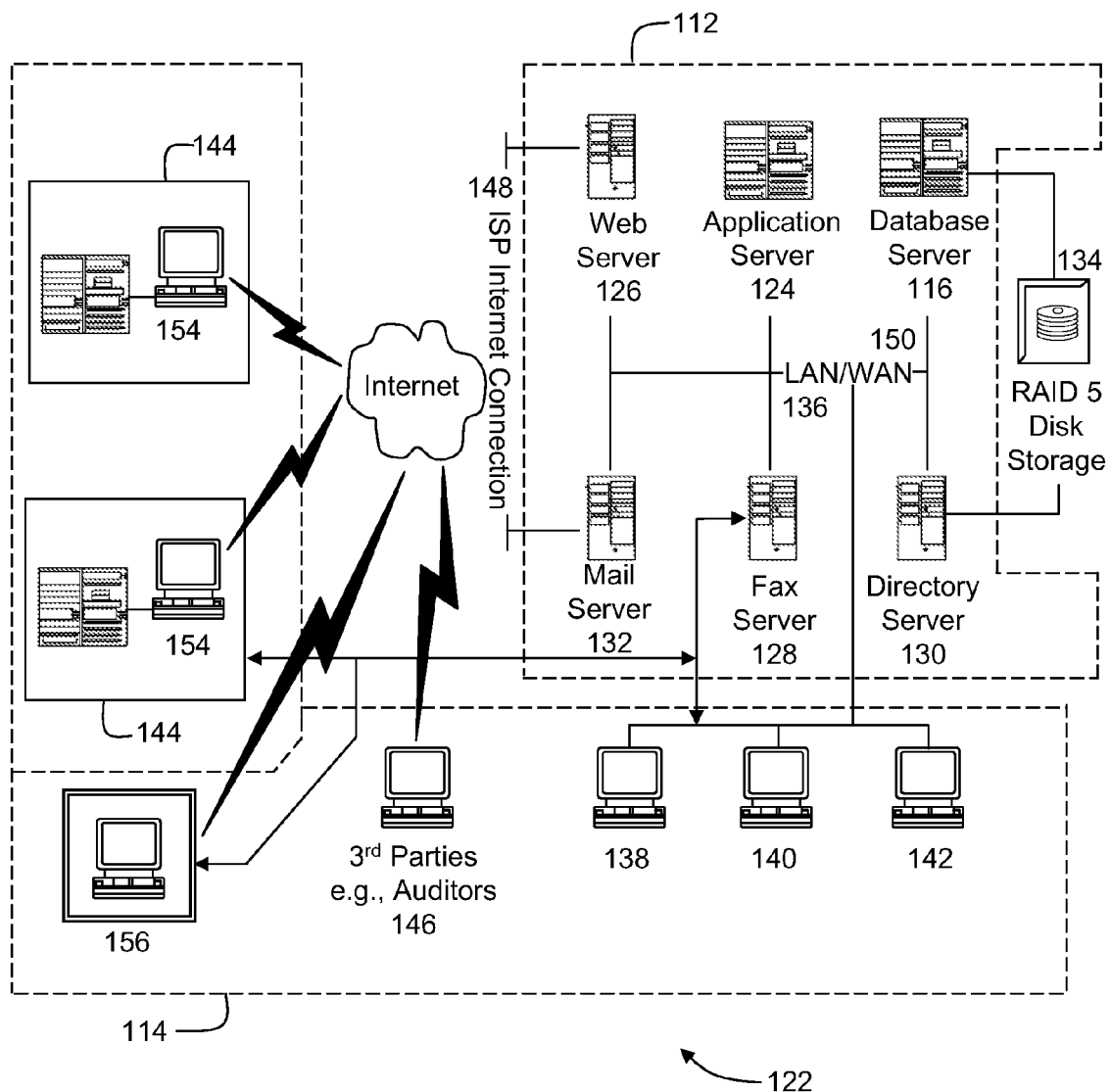
FIG. 3 is an expanded block diagram of an exemplary embodiment of a server architecture of a system in accordance with one embodiment of the present invention

FIG. 3 is an expanded block diagram of an exemplary embodiment of a server architecture of a system 122 in accordance with one embodiment of the present invention. Components in system 122, identical to components of system 100 (shown in FIG. 2), are identified in FIG. 3 using the same reference numerals as used in FIG. 2. System 122 includes server system 112 and client systems 114. Server system 112 further includes database server 116, an application server 124, a web server 126, a fax server 128, a directory server 130, and a mail server 132. A disk storage unit 134 is coupled to database server 116 and directory server 130. Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an Intranet. In the example embodiment, application server 124 may be configured as an authorization server and storage unit 134 may include validation codes from transaction cards. Such that application server 124 is configured to receive transaction information including a validation code from a transaction card involved in a financial transaction, and compare the received validation code to a corresponding validation code stored within storage unit 134 in order to determine whether to authorize the transaction.

Each workstation, 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties 146, e.g., auditors, using an ISP Internet connection 148. The communication in the exemplary embodiment is illustrated as being performed using the Internet, however, any other wide area network (WAN) type communication can be utilized in other embodiments, i.e., the systems and methods are not limited to being practiced using the Internet. In addition, WAN 150 could be used in place of LAN 136.

In the exemplary embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including client system 156 using a telephone link. Fax server 128 is configured to communicate with other client systems 138, 140, and 142 as well.

Figure 4:
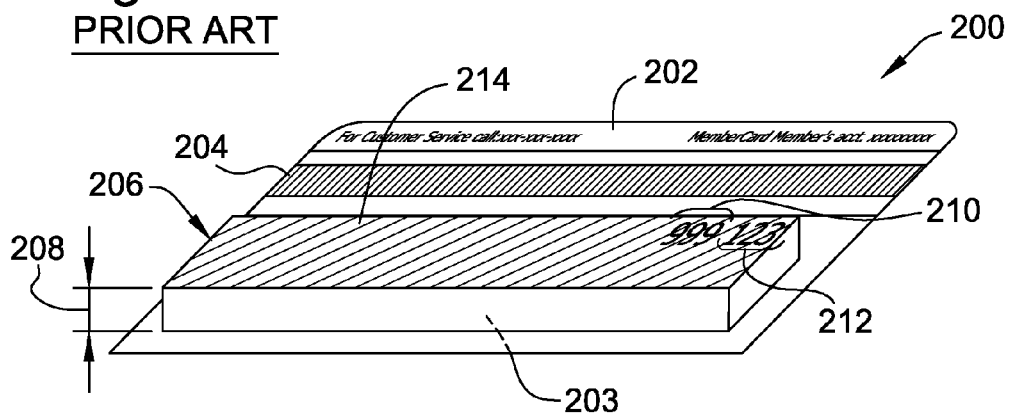
FIG. 4 is a perspective view of a prior art financial transaction card with a card validation code printed on the signature block of the card.

FIG. 4 is an illustration of a known financial transaction card 200. More specifically, FIG. 4 shows financial transaction card 200 having a back side 202 and a front side 203. As illustrated, back side 202 includes a magnetic strip 204 configured to retain account data associated with financial transaction card 200. Back side 202 also contains a signature block 206. Signature block 206 includes a substrate of material coupled to back side 202 of card 200. Signature block 206 has a height 208 extending from back side 202. Height 208 has been exaggerated in FIG. 4 for demonstration purposes. Signature block 206 provides a designated area for the cardholder to manually apply their signature. Signature block 206 includes preprinted indicia 214, such as lines and/or the network or interchange provider name and/or logo, that is printed along a top face of signature block 206. Preprinted indicia 214 is a security feature included on signature block 206 to retain signature signed in ink and provide proof (tamper evidence) of removal or attempt of removal of the signature.

In the embodiment shown in FIG. 4, a partial account number 210 is printed on signature block 206. In alternative embodiments, any number of characters may be printed on signature block 206 to reference the account number assigned to the card and/or cardholder. Adjacent to partial account number 210 is a card validation code 212, also printed on signature block 206. Card validation code 212 is also referred to as CVC. These two sets of numbers are applied to card 200 using indent printing and are located in the upper right hand corner of signature block 206. In alternative embodiments, CVC 212 includes any number of characters, comprising any combination of numbers, letters, symbols, or other indicia which are suitably configured to identify a validation code. Because all characters are printed on signature block 206 with height 208, the characters receive similar indentation depth and ink distribution.

The location of both partial account number 210 and CVC 212 in the upper right corner of signature block 206, presents a problem for cardholders in identifying the correct number for CVC 212 since both account number 210 and CVC 212 use a similar font, and are aligned over the same line and with no visible separation. Another potential problem with this design is the overwriting of the numbers when the cardholder signs the signature block. A cardholder's signature on signature block 206 could potentially affect the legibility of the characters located in signature block 206. If the cardholder is unable to determine which set of numbers represent the CVC or the CVC is illegible due to overwriting by the signature, then the cardholder will be unable to provide the correct security information to process the transaction.

Figure 5:
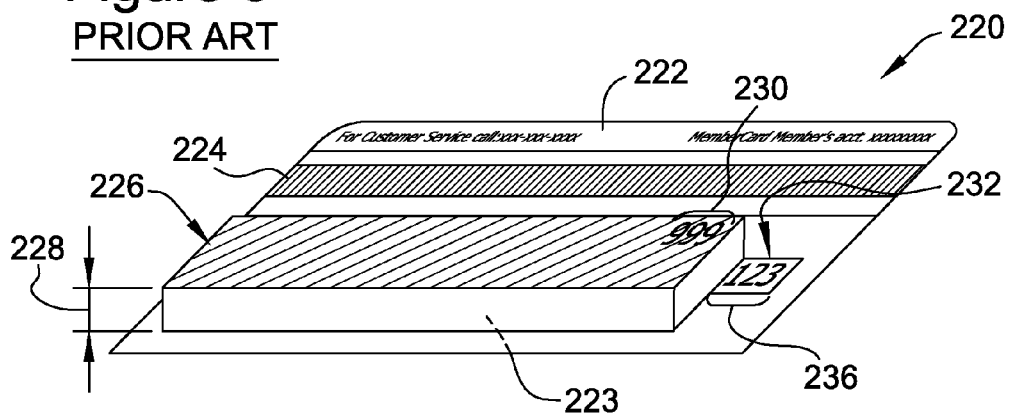
FIG. 5 is a perspective view of a prior art financial transaction card with a card validation code printed in a white area on the card body.

FIG. 5 is an illustration of another known financial transaction card 220. More specifically, FIG. 5 shows financial transaction card 220 having a back side 222 and a front side 223. As illustrated, back side 222 includes a magnetic strip 224 configured to retain account data associated with financial transaction card 220. Back side 222 also contains a signature block 226. Signature block 226 includes a substrate of material coupled to back side 222 of card 220. Signature block 226 has a height 228 extending from back side 222. Height 228 has been exaggerated in FIG. 5 for demonstration purposes. Signature block 226 provides a designated area for the cardholder to manually apply their signature. Signature block 226 also includes the preprinted indicia discussed above in the card shown in FIG. 4.

In addition, printed on signature block 226 is a partial account number 230 or a set of characters associated with an account number. In alternative embodiments, any set of characters suitable to identify the account, the card, and/or the cardholder may be included. Also located on back side 222 of financial transaction card 220 is a white block area 232 that is positioned directly on back side 222 of card 220. A three digit CVC 236 is printed in white block area 232. In alternative embodiments, the CVC may include any number of characters comprising any combination of numbers, letters, symbols or other indicia which are suitably configured to identify a security code. This embodiment provides a distinct separation of partial account number 230 and CVC 236 with the CVC printed directly on the plastic portion of the transaction card allowing the cardholder to visually make the distinction between the two fields.

Partial account number 230 and CVC 236 are indent printed on back side 222 using an indent printing process. Through the printing process, any combination of alphanumeric characters is indented on the back of financial transaction cards. The printing head is adjusted to account for the surface height of the card on which it will be printing in order to set the amount of pressure to be used. In other words, the printing head is adjusted based on the distance between the printing head and the surface or surfaces upon which the printing head is making contact for transferring the printed characters. In this embodiment, the printing head must be adjusted to account for the difference in distance between the printing head and signature block 226, and between the printing head and white block area 232. Typically this adjustment results in the printed characters being printed on signature block 226 with an amount of pressure that is greater than the amount of pressure applied to white block area 232. Accordingly, the characters printed within signature block 226 have a deeper indention and more ink transfer than the characters printed within white block area 232. As a result, the characters printed within signature block 226 are more resistant to removal, either intentionally or through normal wear and tear, than the characters printed within white block area 232.

More specifically, in the embodiment described herein, the printing of partial account number 230 on signature block 226 will receive an indentation with greater depth because signature block 226 has height 228 which is greater than the height of white block area 232 printed directly on the card, and therefore, closer to the printing head. Consequently, partial account number 230 will receive a greater amount of ink because of the deeper indentation, and CVC 236 will be more susceptible to removal either intentionally or through normal use of the card. If CVC 236 receives a smaller indentation and less ink during the printing process as compared to partial account number 230, the printed characters of CVC 236 will likely be more susceptible to removal from back side 222 of card 220. This removal of CVC 236 could be the result of an intentional removal due to a fraudulent use of card 220 or as a consequence of the normal wear and tear of card 220 being used. The removal of CVC 236 from card 220 prohibits the cardholder from being able to use card 220 for at least some transactions.

Figure 6:
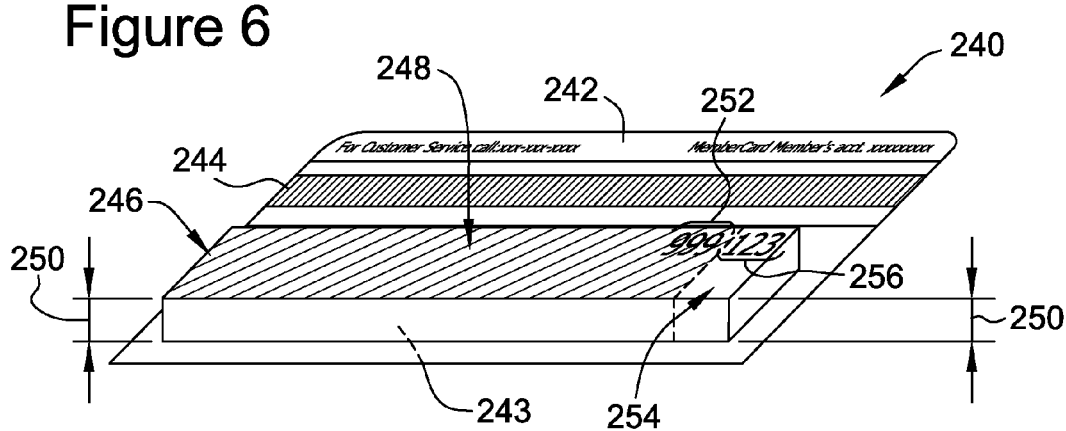
FIG. 6 is a perspective view of a financial transaction card with a signature block in accordance with one embodiment of the present invention.

The systems and methods described herein address the problems described with the cards shown in FIGS. 4 and 5. FIG. 6 is an illustration of a financial transaction card 240. More specifically, FIG. 6 shows financial transaction card 240 having a back side 242 and a front side 243. Back side 242 includes a magnetic strip 244 configured to retain account data associated with financial transaction card 240. Financial transaction card 240 also includes a signature block 246 having at least two distinct data fields or sections, namely account number section 248 and card validation code section 254. Signature block 246 is a substrate of material that has a bottom face and a top face wherein the bottom face is coupled to either back side 242 or front side 243 of card 240. As explained below in detail, the top face of signature block 246 is substantially planar and includes account number data field 248 and card validation code data field 254. These two data fields are non-overlapping. In the example embodiment, signature block 246 is included on a single, integral substrate and data field 248 extends from data field 254. In an alternative embodiment, signature block 246 includes more than one substrate and data field 248 is separate from data field 254.

In the example embodiment, account number section 248 of signature block 246 has a height 250 and has multiple security features. Height 250 has been exaggerated in FIG. 6 for demonstration purposes. Account number section 248 of signature block 246 contains preprinted indicia, such as lines and/or the issuing bank name and/or logo, that is printed along a top face of signature block 246. In a preferred embodiment, account number section 248 has the network provider's name and/or logo printed repeatedly in multiple colors at an angle to provide a tamper-evident security feature. This preprinted indicia identifies the panel as genuine and indicates if the cardholder's signature has been removed. In another embodiment, the security features provided in account number section 248 includes a tamper-resistant security feature. Also included on account number section 248 of signature block 246 is a partial account number 252. Partial account number 252 is indent printed on the upper right hand corner of account number section 248 of signature block 246. In alternative embodiments, any combination of characters which are suitably configured to identify an account number may be included and positioned anywhere on account number section 248 of signature block 246.

Card validation code section 254 of signature block 246 is a white area extension of signature block 246. In the exemplary embodiment, card validation code section 254 does not contain any preprinted indicia or reference to an account number. Card validation code section 254 has a height 250. Height 250 is substantially equal to the height of the partial account number section 248 of signature block 246. In one embodiment, signature block 246 is a single, integral substrate including account number section 248 and card validation code section 254. In an alternative embodiment, signature block 246 includes more than one substrate and account number section 248 is separate from validation code section 254. In the exemplary embodiment, a three digit CVC 256 is indent printed on card validation code section 254. In alternative embodiments, any combination of letters, numbers, or other indicia may be used to represent CVC 256. In the preferred embodiment, CVC 256 is the only marking on card validation code section 254 of signature block 246. In the example embodiment, the font used for printing CVC 256 is unique to the financial industry and is commonly referred to as reverse italics or slanted to the left.

In the exemplary embodiment, all characters of the account number on account number section 248 and CVC 256 of card validation code section 254 of signature block 246 are printed on a surface with a height of 250. Therefore, the distance between the printing head and the printing surface is substantially the same for account number section 248 and card validation code section 254 of signature block 246 resulting in the same depth of indentation for all characters printed thereon. For that reason, the characters indent printed on back side 242 of financial transaction card 240 will receive similar amounts of ink. In alternative embodiments, financial transaction card 240 includes at least one of a credit card, a debit card, a stored value card, a gift card, a prepaid card, and a private label card.

Figure 7:
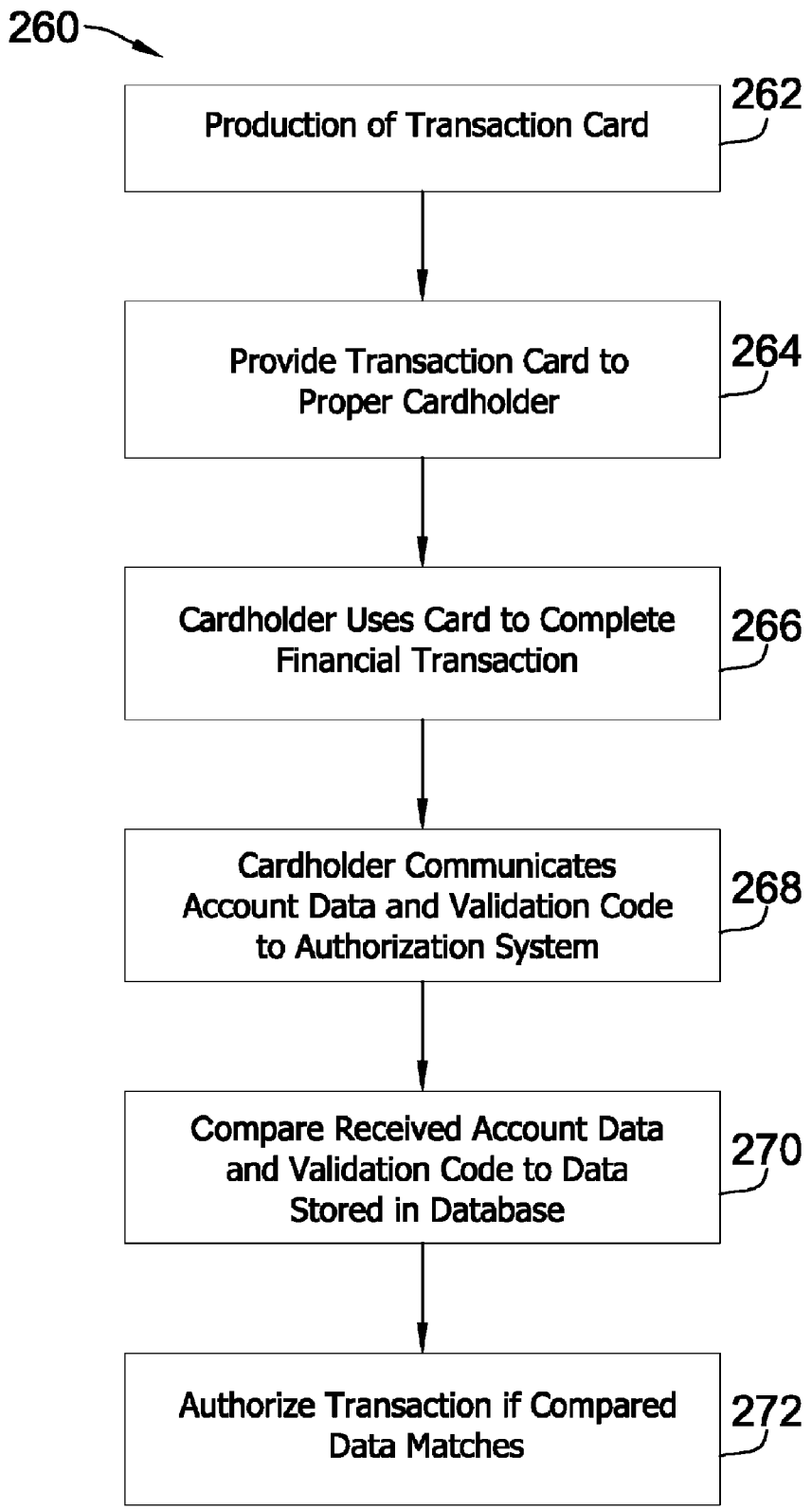
FIG. 7 is a flowchart illustrating exemplary processes utilized by the system shown in FIG. 2 in conjunction with the card validation code illustrated in FIG. 6.

Any of the contemplated embodiments for financial transaction card 240 satisfy a model for card physically present at merchant, on-line and/or website based transactions, such as retail purchases, statement checking, rewards redemption, and bill paying, that typically include authentication of the card and cardholder. Referring to FIG. 7, which is a flowchart 260 showing an authentication process used when a cardholder makes a purchase with a financial transaction card, such as a credit card, and the card is not physically present to the merchant (e.g., online purchase or telephone purchase). The process begins with production 262 of a transaction card as shown in FIG. 6, which is personalized with account data and a unique validation code assigned to the card. The account data and the validation code is stored within a transaction authorization system. The card is then provided 264 to the proper cardholder by the issuer of the card. The card is then used 266 by the cardholder to complete a financial transaction such as a card-not-present transaction wherein the cardholder purchases a good or service from a merchant either over a telephone or a computer system. In completing this transaction, the cardholder communicates 268 account data and the unique validation code using the telephone or computer system to the merchant. The account data and the validation code is then communicated to the transaction authorization system such that the transaction authorization system can compare 270 the received account data and validation code to the account data and validation code stored within the authorization system database. If the data matches, the card is then determined to be authentic and the transaction is authorized 272 by the authorization system. If the data does not match, then the card is determined to be not authentic and the transaction is denied by the authorization system. Other authentication and validation processes and checks may be required and employed by the issuer and acquirer in order to determine the genuineness of the transaction and the actors involved including the card itself and the cardholder.

More specifically, with respect to communicating 268 account data and the unique validation code, the cardholder may perform this step by entering into a website their account number shown on the card and in some cases the expiration date of the card as a factor in a potentially multi-factor authentication process of the card and cardholder. The website may then prompt the cardholder to enter stored confidential cardholder information, including the validation code printed on the financial transaction card. In alternative embodiments, information including cardholder's personal information, including but not limited to, date of birth, social security number, city of birth, may be requested. By correctly entering the requested secured information into the input device (e.g., the user interface associated with the website), the cardholder satisfies authentication checks required by the issuer (or its agent) and the acquirer.

Flowchart 260 illustrates one exemplary process that is utilized by system 100 (shown in FIG. 2). System 100 is sometimes referred to as the financial transaction card payment system, which is accessed at some point during the above described authentication process. In the example embodiment, system 100 may be utilized by an "issuer" who issues a financial transaction card, a consumer who uses the financial transaction card in the various transactions described herein, a merchant who sells a product, a "merchant bank" or an "acquiring bank," and a credit card network or interchange for processing financial transactions of the type listed above.

In the example embodiment, system 100 facilitates the authentication process which, at least in part, assesses whether the user (or a designee of the user) of the financial transaction card is in actual physical custody of the financial transaction card. The technical effect of the systems and methods described herein is achieved by verifying that the correct CVC has been entered into a user interface by a user. As described above, the correct CVC is the set of alphanumeric characters that correspond to the physical body of the financial transaction card and is requested after a correct card number has been entered.

The above described authentication process is implemented as a portion of a security model, as mentioned above, which, in addition to reducing illegitimate purchases, can also be used as part of the login process for one or more of statement viewing, online bill payment, online reward redemption, depending on the card function (i.e., if the card is a credit card, debit card, pre-paid card, etc.).

The embodiments are also effective for anonymous gift cards. Although such cards are typically treated as cash, if someone that tried to utilize such a card without knowledge of the validation code was implemented, there is a possibility that they could not use the gift card for an online purchase or other transaction not made in person.

The systems and methods described herein enable a user, such as a financial transaction card network (e.g., MasterCard®), to facilitate completing financial transactions using transaction cards over the network, and to increase the useful life of such cards by improving the printing of the validation code on the cards. The systems and methods described herein also enable a user, such as a card network, to reduce the number of fraudulent transactions that take place with respect to an account of a cardholder who may have inadvertently allowed their account number to be acquired by another, unauthorized, person. Once a potential user of a financial transaction card-based account has entered a correct user card number associated with an account, the transaction card network works to provide a second factor of authentication, by requesting the CVC. Should the user not be in physical possession of at least a copy of the physical financial transaction card, they generally will not be able to enter further authentication elements implemented by the operator of the transaction card network. For example, in the case where an unauthorized user of the card has illegally skimmed account data from a transaction card, the unauthorized user would not be able to satisfy the authentication criteria in card-not-present type transactions with just the skimmed data, but rather, would need the validation code printed on the card.

The system described herein stores a validation code for each of a plurality of issued financial transaction cards such that each may be utilized with the authentication process described in detail above, providing the end result of more secure transactions for legitimate cardholders and a more difficult transaction for someone illegitimately trying to utilize the account of the financial transaction cardholder.

While the invention has been described in terms of various specific embodiments, those skilled in the art will recognize that the invention can be practiced with modification within the spirit and scope of the claims.

What is claimed is:

1. A financial transaction card associated with an account of a cardholder, said financial transaction card comprising:
   a front side;
   a back side;
   a signature block comprising a substrate having a bottom face and a top face, the bottom face coupled to at least one of said sides of said card, the top face being substantially planar and including a first data field and a second data field, the first data field and the second data field being non-overlapping and visually distinct from one another independent of account data present in each data field, the top face of the first data field having a first visual appearance independent of account data present in the first data field, the top face of the second data field having a second visual appearance independent of account data present in the second data field, the first visual appearance being different than the second visual appearance, the first visual appearance and the second visual appearance defining a line visually separating the first data field from the second data field;
   an account identifier displayed within the first data field, the account identifier comprising a set of characters for at least partially identifying the cardholder account; and
   a validation code associated with the account displayed within the second data field,
   wherein the account data comprises at least one of the account identifier and the validation code.

2. A financial transaction card according to claim 1 wherein one of the data fields includes a security feature.

3. A financial transaction card according to claim 2 wherein the security feature comprises at least one of a tamper-resistant security feature and a tamper-evident security feature.

4. A financial transaction card according to claim 2 wherein the security feature comprises preprinted indicia providing a tamper-evident security feature.

5. A financial transaction card according to claim 1 wherein the first data field and the second data field are of substantially the same height relative to one of said sides of said card.

6. A financial transaction card according to claim 1 wherein the validation code is a set of alphanumeric characters that is unique to the card, and is assigned to the cardholder.

7. A financial transaction card according to claim 1 wherein the validation code is printed on the signature block substrate within the second data field, wherein the validation code is indent printed with a reverse italics font.

8. A financial transaction card according to claim 1 wherein the first data field includes data associated with the account displayed therein, a section for receiving a signature of the cardholder, and a security feature including preprinted indicia, and wherein the second data field is in visual contrast with the first data field and includes the validation code printed therein such that the validation code is visually distinct from the account data displayed within the first data field.

9. A method for facilitating use of a financial transaction card associated with an account of a cardholder, said method comprising the steps of:

issuing the financial transaction card to the cardholder, wherein the financial transaction card has a signature block and a validation code associated with the account, the signature block having a bottom face and a top face, the bottom face coupled to a side of the card, the top face being substantially planar and including a first data field and a second data field, the first data field and the second data field being non-overlapping and visually distinct from one another when the first and second data fields do not include account data, the top face of the first data field having a first visual appearance, the top face of the second data field having a second visual appearance, the first visual appearance being different than the second visual appearance independent of account data, the first visual appearance and the second visual appearance defining a visually discernable border separating the first data field from the second data field, the validation code displayed within the second data field;

storing cardholder information within a database including a name of the cardholder, an account number associated with the cardholder, and the validation code displayed within the second data field and wherein the account data comprises at least one of an account identifier and the validation code, wherein the account identifier includes a set of characters representing the account number;

prompting the cardholder to provide the account number, and the validation code displayed within the second data field in order to engage in a financial transaction;

comparing the provided account number and validation code with the cardholder information stored within the database; and authenticating the card for the financial transaction.

10. A method for facilitating use of a financial transaction card according to claim 9 wherein the first data field and the second data field are visually separate from one another.

11. A method for facilitating use of a financial transaction card according to claim 9 wherein one of the data fields includes a security feature.

12. A method for facilitating use of a financial transaction card according to claim 11 wherein the security feature comprises preprinted indicia providing a tamper-evident security feature.

13. A method for facilitating use of a financial transaction card according to claim 11 wherein the security feature comprises at least one of a tamper-resistant security feature and a tamper-evident security feature.

14. A method for facilitating use of a financial transaction card according to claim 9 wherein the first data field and the second data field are substantially the same height relative to one of said sides of said card.

15. A method for facilitating use of a financial transaction card according to claim 9 wherein the validation code is a set of alphanumeric characters that is unique to the card, and is assigned to the cardholder.

16. A method for facilitating use of a financial transaction card according to claim 9 wherein the validation code is printed on the signature block substrate within the second data field, wherein the validation code is indent printed with a reverse italics font.

17. A method for facilitating use of a financial transaction card according to claim 9 wherein the first data field includes data associated with the account displayed therein, a section for receiving a signature of the cardholder, and a security feature including preprinted indicia, and wherein the second data field is in visual contrast with the first data field and includes the validation code printed therein such that the validation code is visually distinct from the account data displayed within the first data field.

18. A financial transaction card according to claim 1 wherein the front side of the financial transaction card, the back side of the financial transaction card, the bottom face of the substrate, and the top face of the substrate are substantially parallel.

* * * * *